US006275714B1

United States Patent
Kintz et al.

(10) Patent No.: US 6,275,714 B1
(45) Date of Patent: *Aug. 14, 2001

(54) PHONE WITH ERGONOMIC VIRTUAL IMAGE DISPLAY

(75) Inventors: Gregory J. Kintz; David L. Phillips, both of Mountain View, CA (US)

(73) Assignee: Inviso, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,263

(22) Filed: Feb. 26, 1998

(51) Int. Cl.[7] .................... H04B 1/38; H04M 1/00
(52) U.S. Cl. .................. 455/566; 455/349; 455/575; 345/7; 379/433
(58) Field of Search ...................... 379/433, 434; 455/90, 575, 566, 351, 349, 557; 345/7, 145, 905

(56) References Cited

U.S. PATENT DOCUMENTS

| 5,485,504 | * | 1/1996 | Ohnsorge | 455/566 |
| 5,490,202 | * | 2/1996 | Maekawa | 455/90 |
| 5,491,491 | * | 2/1996 | Lebby et al. | 345/7 |
| 5,513,383 | * | 4/1996 | Tsao | 455/90 |
| 5,542,106 | * | 7/1996 | Krenz et al. | 455/90 |
| 5,771,124 | * | 6/1998 | Kintz et al. | 359/633 |
| 5,867,795 | * | 2/1999 | Novis et al. | 455/90 |
| 5,901,222 | * | 5/1999 | Macor | 455/90 |
| 5,969,698 | * | 10/1999 | Richard et al. | 345/7 |
| 5,970,418 | * | 10/1999 | Budd et al. | 455/566 |
| 6,085,112 | * | 7/2000 | Kleinschmidt et al. | 455/556 |

FOREIGN PATENT DOCUMENTS

| 0 833 486 A2 | 1/1998 | (EP) | H04M/1/00 |
| 09198352 | * | 7/1997 | (JP) . |
| 9-219755 | 8/1997 | (JP) | H04M/11/02 |
| WO 96/35288 | * | 11/1996 | (WO) . |
| WO 97/29582 | 8/1997 | (WO) | H04M/11/00 |

OTHER PUBLICATIONS

Patent Abstract Of Japan, vol. 097, No. 011, Nov. 28, 1997; JP 09 198352.

* cited by examiner

*Primary Examiner*—Nguyen T. Vo
*Assistant Examiner*—Eliseo Ramos-Feliciano
(74) *Attorney, Agent, or Firm*—David J. Weitz; Wilson Sonsini Goodrich and Rosati (57) ABSTRACT

A phone accessory which include an insert which can be positioned between a phone and power source. The insert has a first side with a set of electrical contacts which align with electrical contacts on the phone when the phone is attached to the insert. The insert also has a second side with a set of electrical contacts which align with electrical contacts on the power source when the power source is attached to the insert. When the insert is positioned between the phone and the power source, the phone is in electrical communication with the power source through the insert. The insert also includes an insert dataport which couples with a dataport on the phone when the phone is attached to the insert. A virtual image display is attached to the insert and in electrical communication with the insert dataport for receiving image data from the phone through the phone and insert dataports.

32 Claims, 11 Drawing Sheets

PHONE WITH ERGONOMIC VIRTUAL IMAGE DISPLAY

BACKGROUND OF THE INVENTION

1. Field of the Invention

This invention relates generally to the field of telecommunications and more particularly to phones which carry virtual image displays allowing users to view documents and graphics.

2. Description of the Related Art

Recent advances in technology have allowed cellular phone manufacturers to provide phones which contain virtual image displays. Virtual image displays use a real image which may be smaller than the size of a stamp and use optics to provide the user with a magnified virtual image of the real image. Phones including these displays can be used to view documents or other digital displays such as e-mail, faxes or web pages. Due to their small size, virtual image displays are suitable for attachment to cellular phone.

At present, most phones which include virtual image displays have the display mounted on the phone. If a consumer wishes to use a virtual image display with a phone, the consumer must purchase a new phone which includes a virtual image display. A need exists for an accessory which can be used with existing phones to provide virtual image display abilities to the phone.

Kopin Corp. has recently developed Cyber Display, a cellular phone with a virtual image display screen to one side of the mouthpiece. The phone has an asymmetrical design and is thus adapted for left or right handed use but not use with either hand. A need exists for a phone suitable for ambidextrous use. This and other needs are provided by the phone accessory and phone of the present invention.

SUMMARY OF THE INVENTION

The present invention relates to a phone accessory including an insert which can be positioned between a phone and power source. The insert has a first side with a first set of electrical contacts which contact electrical contacts on the phone when the phone is attached to the insert. The insert also has a second side with a second set of electrical contacts which contact electrical contacts on the power source when the power source is attached to the insert. When the insert is positioned between the phone and the power source, the phone is in electrical communication with the power source through the insert. The insert also includes an insert dataport which couples with a dataport on the phone when the phone is attached to the insert. A virtual image display is attached to the insert and in electrical communication with the insert dataport for receiving image data from the phone through the phone and insert dataports.

The present invention also relates to a phone with a virtual image display attached to phone. The virtual image display is connected to the phone so as to receive image data from the phone. In one embodiment, the virtual image display is positioned along a longitudinal axis passing through the center of the phone between the earpiece and mouthpiece on the phone.

According to this embodiment, the phone and virtual image display are preferably sufficiently symmetrical about the longitudinal axis so as to allow ambidextrous usage. The phone accessory or phones of the present invention can include at least one user input positioned on the insert or on the phone. At least one user input can be a positioning device for controlling a position of a cursor on the virtual image display or an input device for providing an input at a position of a cursor on the virtual image display. The one or more inputs are preferably arranged sufficiently symmetrically on the phone accessory or phone so that the one or more inputs can be used in a similar manner regardless of whether the phone is in the left or right hand.

In any of the above embodiments, the virtual image display can be attached to the accessory or phone by a mechanism which allows the display to rotated around the longitudinal axis of the phone and or angularly relative to the longitudinal axis.

In any of the above embodiments, the accessory or phone can include logic in communication with a sensor for detecting whether the phone is being held in a user's left or right hand; the logic controls the orientation of the virtual image produced by the virtual image display as well as the functions performed by the user inputs in response to the detected orientation of the phone.

DETAILED DESCRIPTION

Figure 1A:
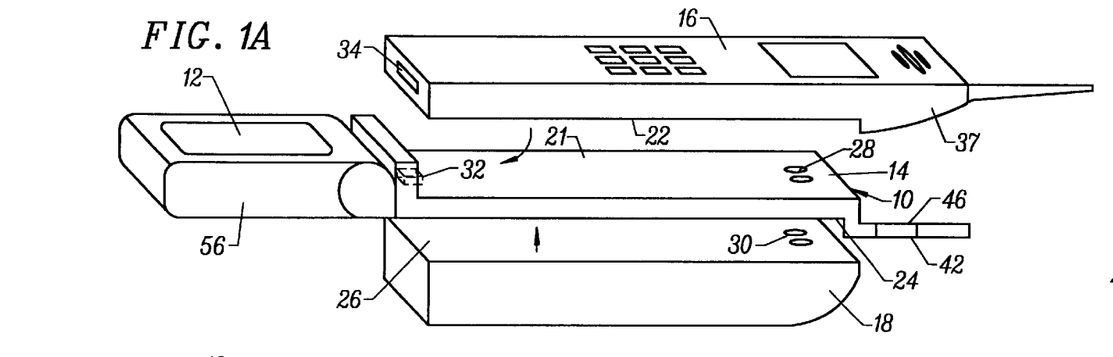
FIG. 1A is a sideview of an accessory according to the present invention.
Figure 1B:
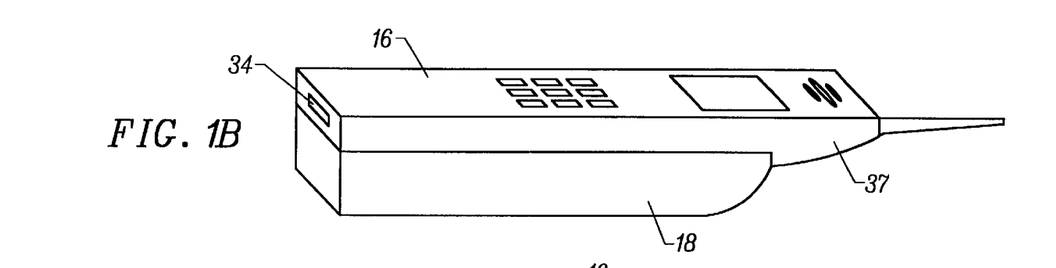
FIG. 1B is a sideview of a phone and power source which are suitable for use with the insert of FIG. 1A.
Figure 1C:
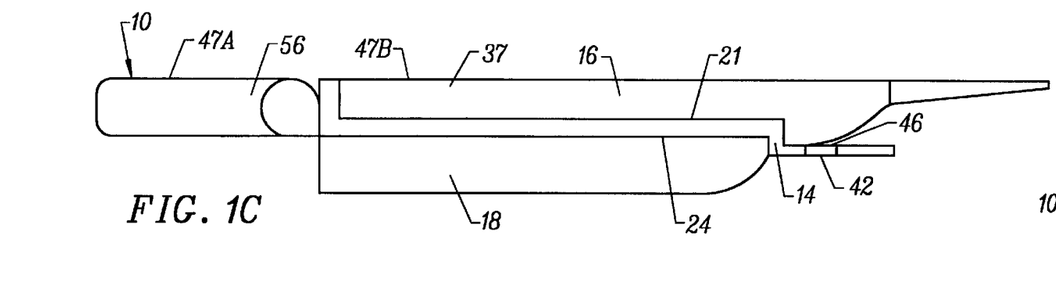
FIG. 1C is a sideview of the insert of FIG. 1A attached to the phone and power source of FIG. 1B.

FIGS. 1A–1D illustrate a phone accessory 10 in combination with a portable phone according to the present invention. The accessory includes a virtual image display 12 attached to an insert 14. The insert 14 can be positioned between a phone 16 and its power source 18 (shown together in FIG. 1A) such that the phone 16 is in electrical communication with the power source 18 through the insert 14, as shown in FIG. 1C. Similarly, the virtual image display 12 is in electrical communication with the phone 16 such that the virtual image display 12 can receive image data from the phone 16. The insert 14 can also include at least one user input (not illustrated). The at least one user input can be a positioning device for controlling a position of a cursor on the virtual image display 12 and/or an input device for providing an input at the position of the cursor. Using the accessory, a consumer can add a virtual image display to an existing phone, thus avoiding the need to buy a phone with a virtual image display.

Figure 2:
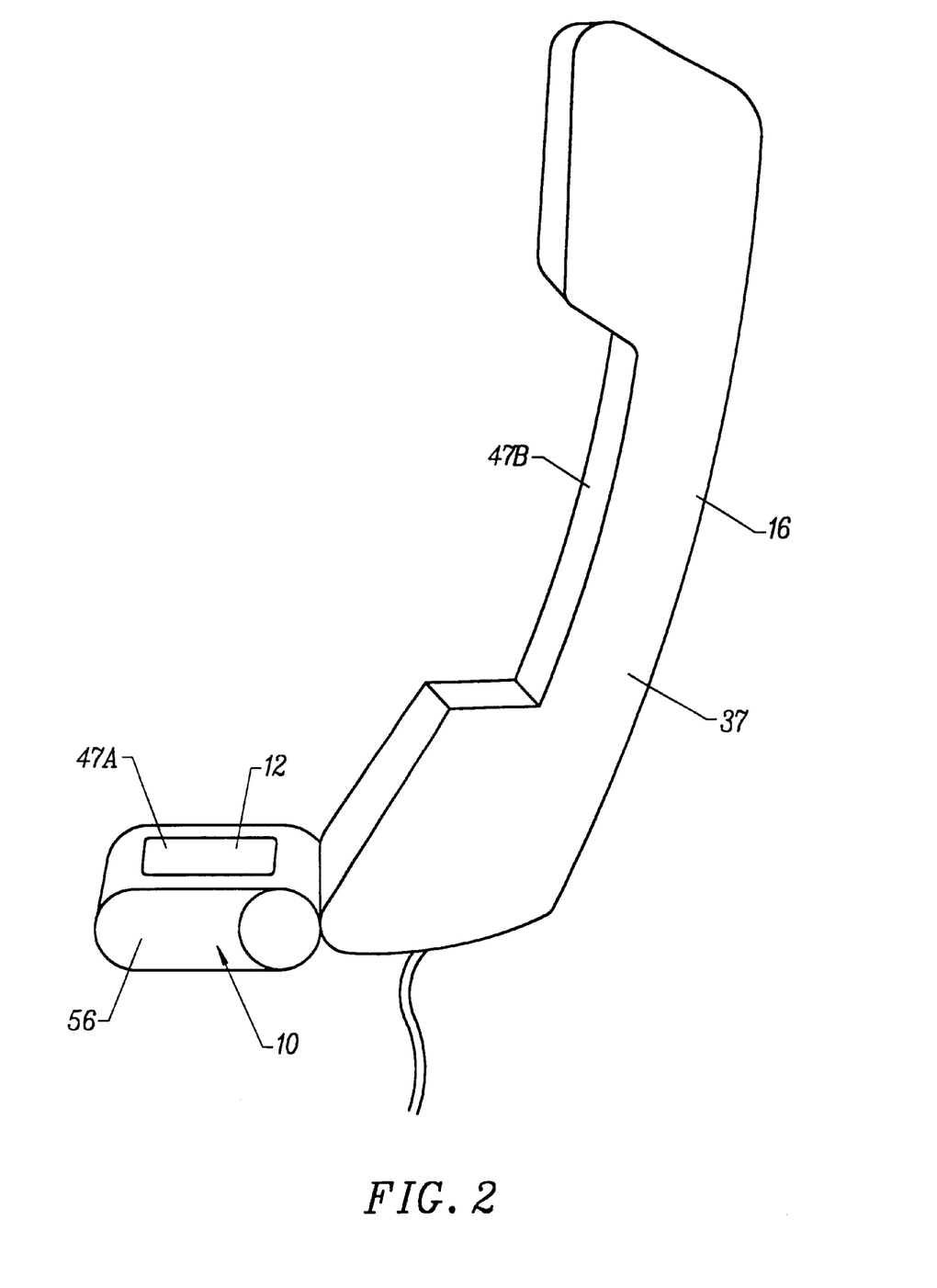
FIG. 2 is a sideview of a phone including a centrally positioned virtual image display.

Another embodiment of the invention is illustrated in FIG. 2. The virtual image display 12 is attached to a phone 16. The virtual image display 12 is in electrical communication with the phone 16 such that the virtual image display 12 can receive image data from the phone 16. At least one user input (not illustrated) can be positioned on the phone 16 to allow the user to interact with an image on the virtual image display 12.

In the embodiments described above, the virtual image display 12 can fixed in position relative to the phone or attached to the phone so the face of the virtual image display 12 moves relative to the face of the phone 16. The face of the virtual image display 12 can be variably angled relative to the face of the face of the phone. Similarly, the face of the virtual image display 12 can be rotated relative to the face of the phone 16. Further, the virtual image display 12 can be attached to the phone 16 such that the face of the virtual image display 12 has both rotational and angular movement relative to the phone 16. As a result, each user can adjust the virtual image display 12 to suit their personal preference.

The virtual image display 12 can be attached so the display 12 centrally positioned relative to the lateral sides of the phone. As a result, the virtual image display 12 is symmetrically positioned relative to the phone 16 and can be viewed regardless of the hand used to hold the phone 16.

Figure 3A:
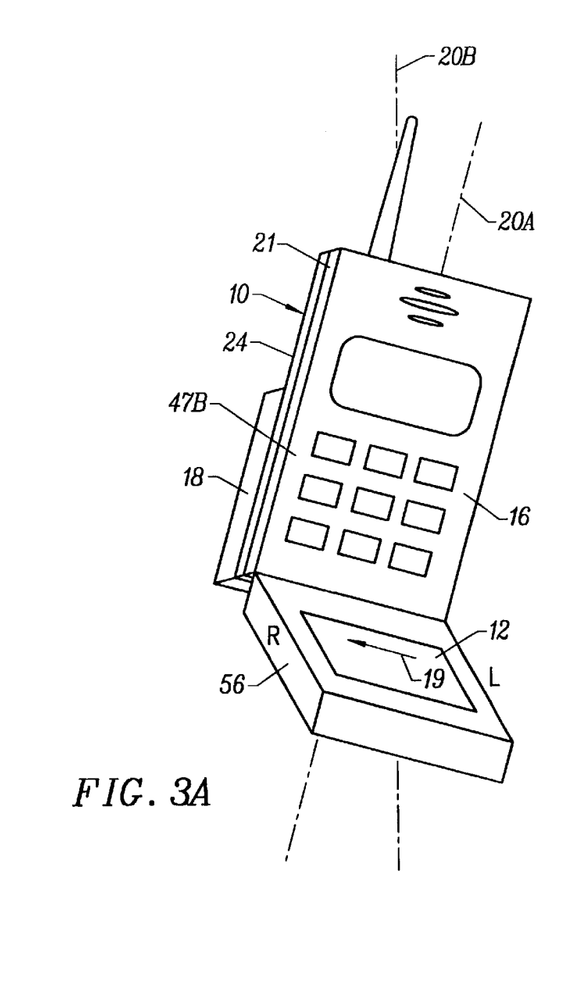
FIG. 3A is a sideview of a phone including an insert according to the present invention positioned for use with the right hand.
Figure 3B:
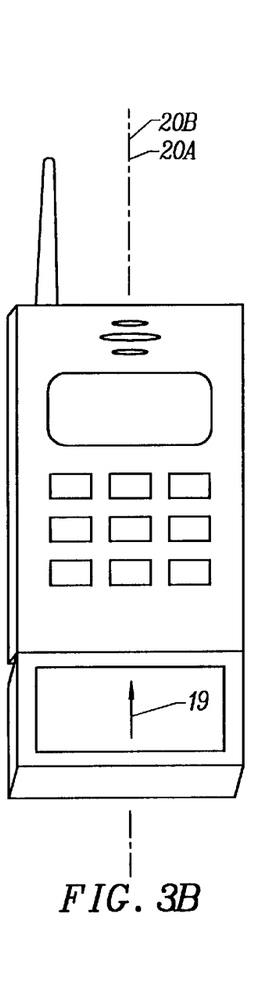
FIG. 3B is a sideview of the phone of FIG. 3A after the user has switched from the right to the left hand and the image on the virtual image display has not been inverted.
Figure 3C:
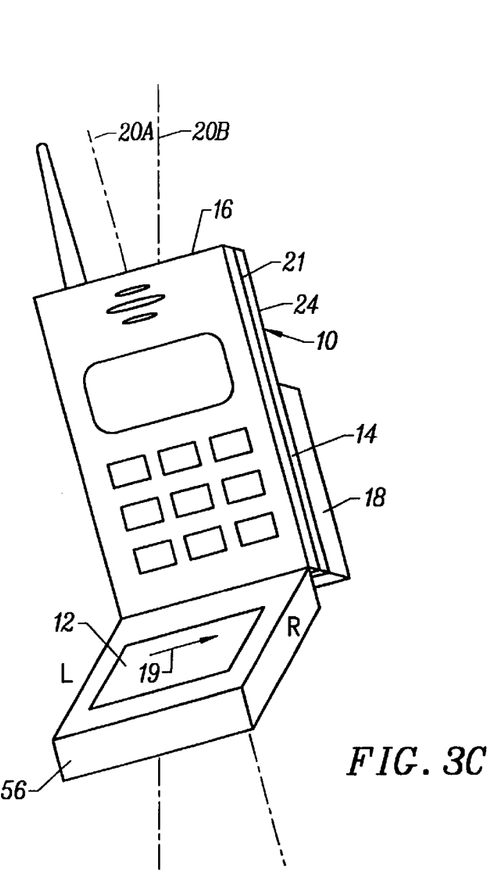
FIG. 3C illustrates the virtual image display of FIG. 3B after the image on the virtual image display has been inverted.

The embodiments described above can include a sensor for detecting the orientation of the phone 16. For example, the sensor can be used to detect whether a longitudinal axis of the phone is to the left or right of vertical. This can be used to indicate whether the phone is in the user's left or right hand. The phone or accessory can also include logic which is in communication with the sensor and which modifies the orientation of the image in response. Specifically, as the phone 16 is rotated through a vertical plane, the image can be inverted. FIGS. 3A–3C illustrate the results of a user switching hands. FIG. 3A illustrates the orientation of a displayed image 19 when a user holds the phone 16 in the right hand and the phone's longitudinal axis 20A is to the right of a vertical plane 20B. FIG. 3B illustrates the orientation of the displayed image 19 when the phone's longitudinal axis 20A is aligned with the vertical plane 20B. FIG. 3C illustrates the displayed image 19 when the phone is oriented to be held in the user's left hand and thus oriented to the left of the vertical plane 20B. As illustrated by FIGS. 3A–3C, the sensor and logic function to orient the displayed image according to how the user is holding the phone and thus allows the user to switch hands freely while viewing the image 19.

Similarly, the logic in combination with the sensor can function to invert the functions of user input devices in response to the vertical orientation of the phone 16. Without the inversions of user input device functions, when the user switches hands, inputs which were previously activated by the index finger of one hand must be activated by another finger on the other hand. However, after the inversion of functions performed by the present invention, an input activated by the left index finger would be activated by the right index finger.

Referring again to FIG. 1A, a virtual image display 12 is coupled to an insert 14 which can be positioned between an existing phone 16 and power source 18. An insert first side 21 is configured to be attached to a phone attachment side 22 and an insert second side 24 is configured to be attached to a power source attachment side 26. When the first side 21 of the insert 14 is attached to the phone 16, a plurality of electrical contacts 28 on the first side contact with electrical contacts on the phone (not shown). When the second side 24 of the insert 14 is attached to the power source 18, a plurality of electrical contacts on the second side (not shown) contact with electrical contacts 30 on the power source 18. As a result, the phone 16 can be in electrical communication with the power source 18 through the insert 14.

The insert 14 is designed to fit between phone 16/power source 18 pairs which are configured to be attached to one another without the insert 14 as illustrated in FIG. 1B. A cellular phone and the corresponding battery is an example a suitable phone/power source pair. To facilitate attachment of the insert 14 to the phone 16, the insert first side 21 is preferably shaped substantially similar to the power source attachment side 26. Similarly, to facilitate the attachment of the insert 14 to the power source 18, the insert second side 24 is preferably shaped substantially similar to the phone attachment side 22.

The virtual image display 12 is in electrical communication with an insert dataport 32 positioned on the first side of the insert 14. When the insert 14 is attached to the phone 16, the insert dataport 32 is aligned with a phone dataport 34 so the virtual image display 12 can receive image data from the phone 16 through the phone and insert dataports 32, 34.

Figure 1D:
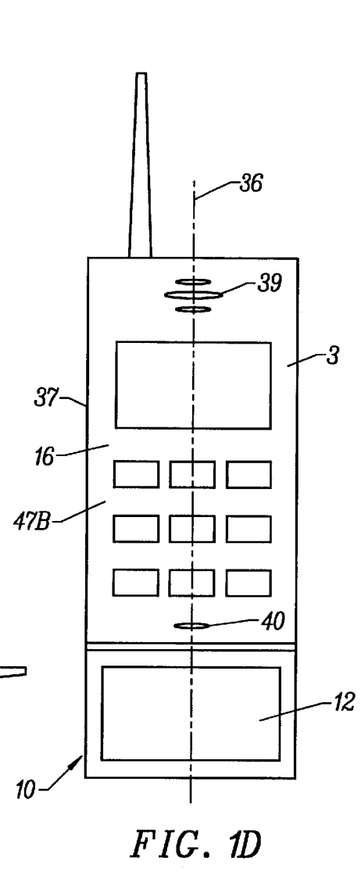
FIG. 1D is a sideview of the front of a phone including the insert of FIG. 1A.

A central longitudinal axis 36 passes through the center of the insert 14 and is aligned with an earpiece 38 and a mouthpiece 40 on the phone 16 as illustrated in FIG. 1D. The virtual image display 12 is aligned substantially symmetrical relative to the central longitudinal axis 36. As a result, the virtual image display is centrally positioned relative to the lateral sides 37 of the phone 16.

Figure 4A:
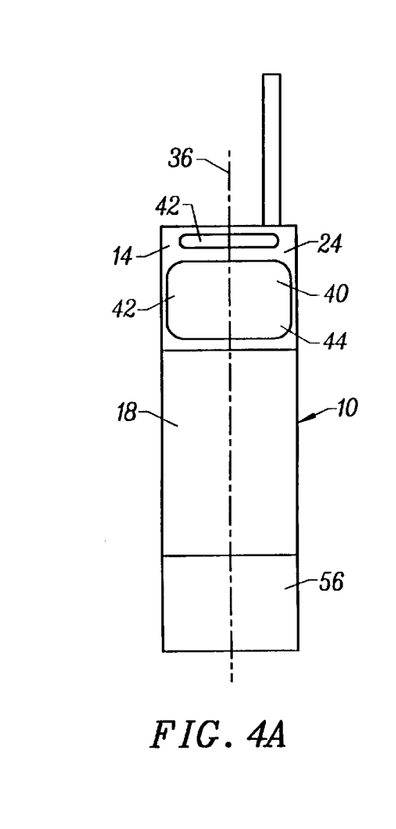
FIG. 4A is a sideview of a side of an insert according to the present invention including a positioning device and a single centrally positioned input device.
Figure 4B:
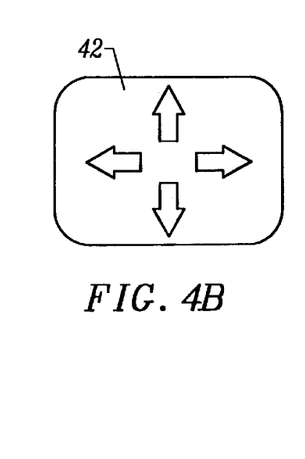
FIG. 4B is a sideview of a positioning device comprising a plurality of directional inputs.

As illustrated in FIG. 4A at least one user input 42 can be positioned on the insert 14. The at least one user input 42 can be a positioning device 44 for controlling the position of a cursor on the virtual image display 12. Acceptable positioning devices 44 include, but are not limited to a track ball or a track pad such as the GlidePoint manufactured by Alps. The positioning device 44 can also be a plurality of directional indicators as illustrated in FIG. 4B. By pressing a particular directional button, the user controls which direction the cursor on the virtual image display moves.

Referring again to FIG. 4A, the at least one user input 42 can include an input device 46 for providing an input at the position of a cursor on the image display 12. For instance, the user input 42 can be a user activated button such as a button on a typical computer mouse. The user input can be positioned on the second side or on an edge of the insert 14. As illustrated, the input device 46 can be symmetrically positioned relative to the central longitudinal axis 36.

Figure 4C:
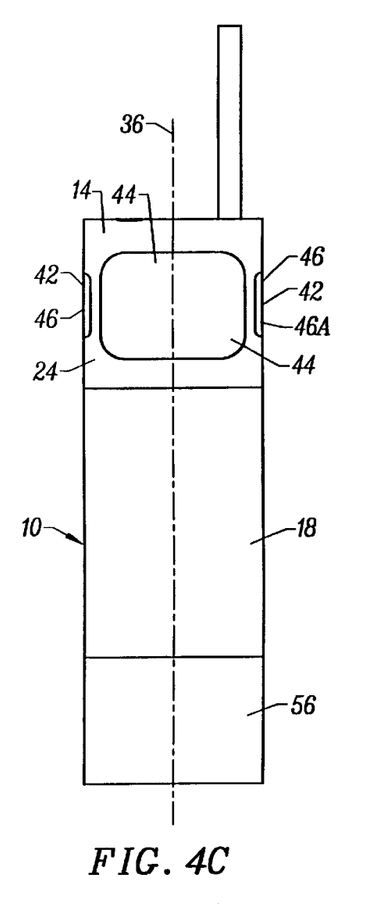
FIG. 4C is a sideview of a side of an insert according to the present invention including a positioning device and a plurality of input devices positioned symmetrically relative to a central longitudinal axis.
Figures 5A, 5B, 5C, 5D:
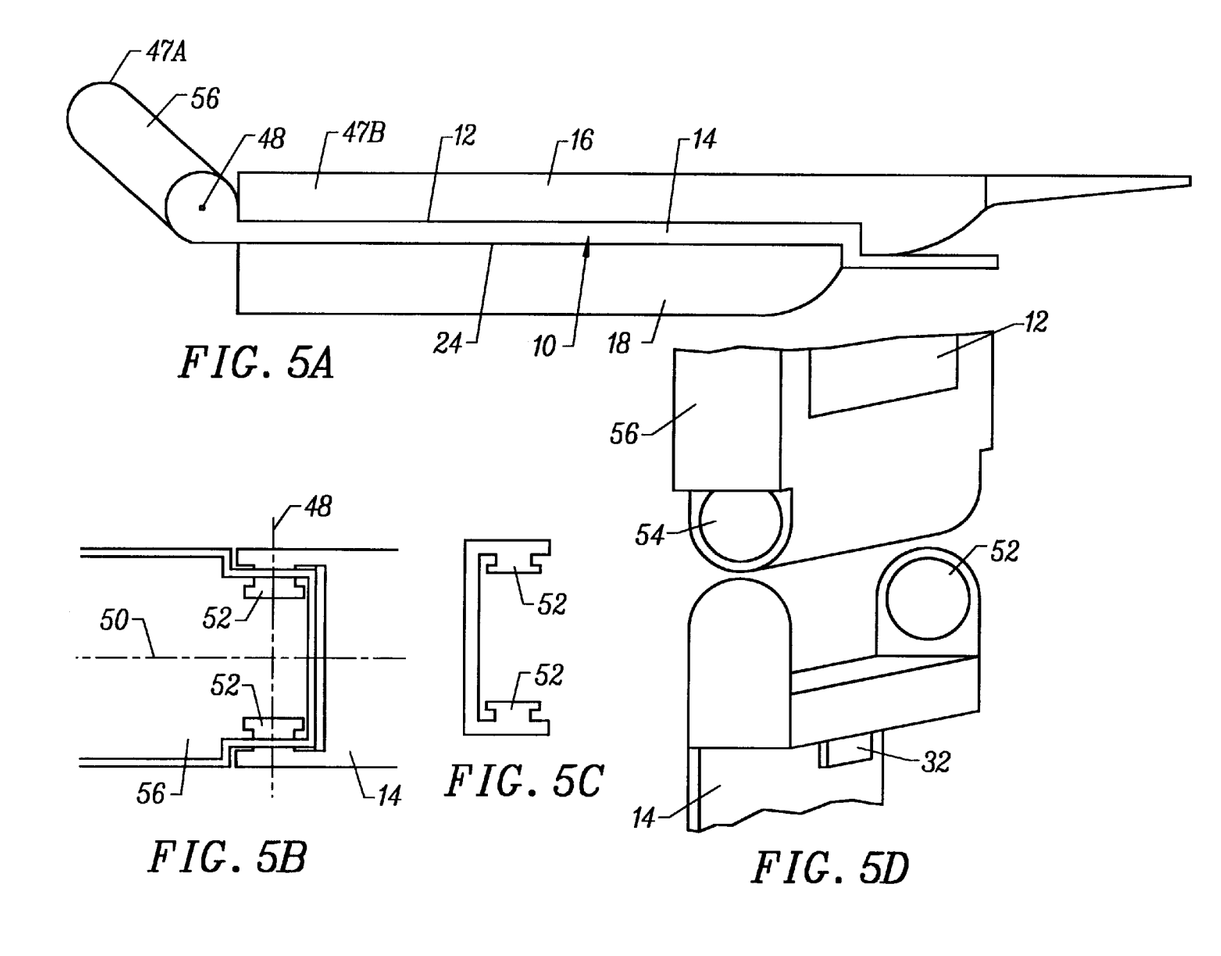
FIG. 5A illustrates a virtual image display which can rotate around a lateral axis.
FIG. 5B is a cross sectional view of the hinge area of FIG. 5A.
FIG. 5C is a topview of the first and second hub of FIG. 5B.
FIG. 5D is a sideview of the hinge of FIG. 5A disassembled.

The at least one user input 42 can also be a plurality of input devices 46 as illustrated in FIG. 4C. Each input device 46 can be positioned on the opposite side of the central longitudinal axis 36 from another input device 46. Each input device 46 can provide the same input, different input or no input.

While each of the at least one inputs 42 illustrated in FIGS. 4A–4C are illustrated on an insert 14, it is contemplated that the at least one user input 42 for the embodiment of FIG. 2 can be included directly on a phone 16 (not illustrated).

The virtual image display 12 can be attached to the accessory or phone so that the face of the virtual image display can be variably angled relative to the phone face. FIGS. 5A–5D illustrate an embodiment of a mechanism for attaching the display such that the display face 47A can be variably angled relative to the phone face 47B. The virtual image display 12 can be hinged so as to rotate around a lateral axis 48 illustrated in FIG. 5B which is perpendicular to the longitudinal axis 50. A first and second hubs 52 are inserted into corresponding first and second openings 54 on a display housing 56 illustrated in FIG. 5D. The display housing 56 slides on the hubs 52 during rotation of the virtual image display 12.

Figures 6A, 6B, 6C, 6D:
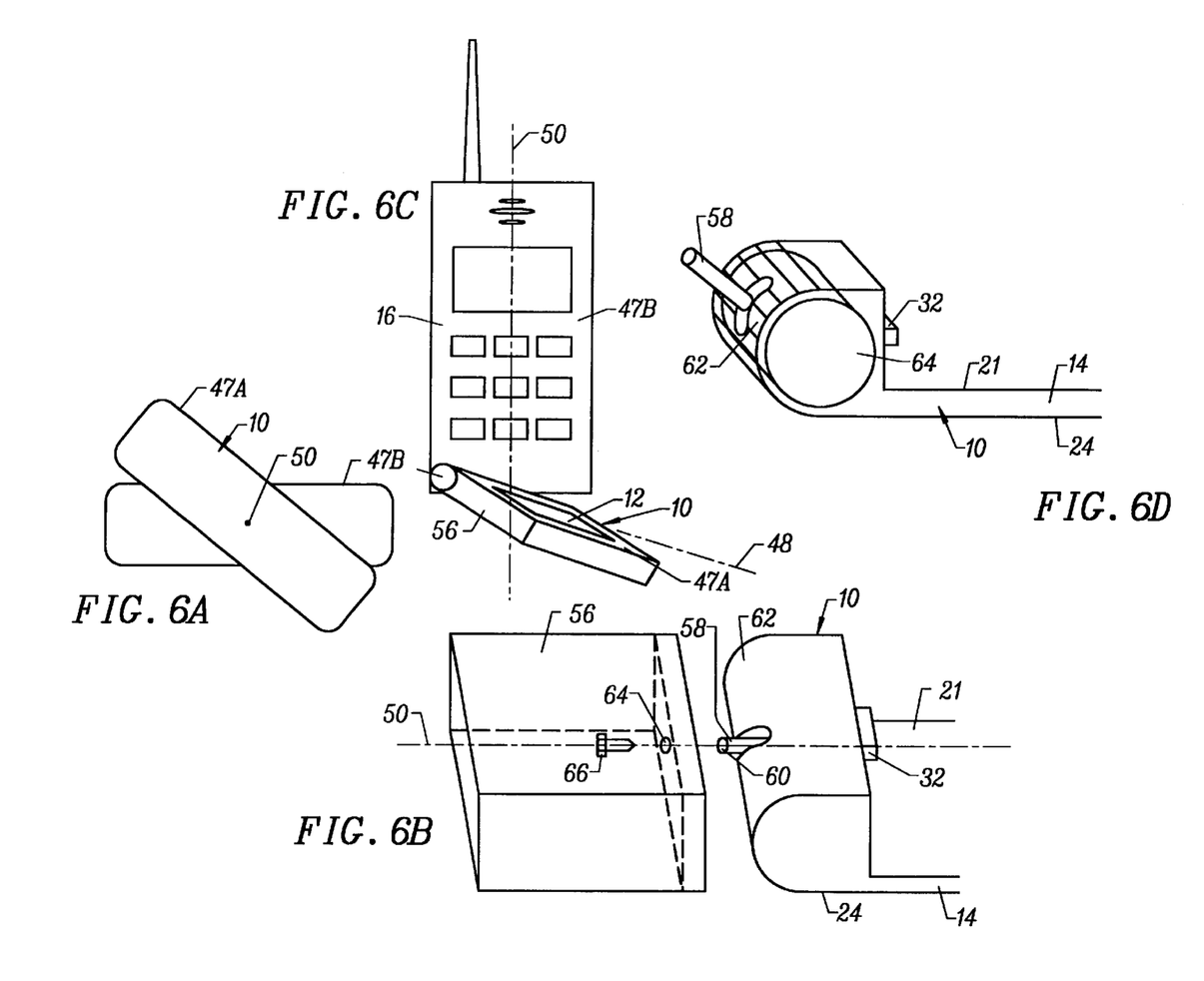
FIG. 6A illustrates a virtual image display rotated around a longitudinal axis.
FIG. 6B illustrates the attachment of the virtual image display of FIG. 6A.
FIG. 6C illustrates a virtual image display which can rotate along both a longitudinal and lateral axis.
FIG. 6D illustrates a cross section of FIG. 6B.

The display face 47A can also be rotated relative to the phone face 47B. FIG. 6A illustrates the virtual image display 12 rotated around the longitudinal axis 50. Referring to FIG. 6B, a mounting support 58 with a central lumen 60 extends from a bottom edge 62 of the insert 14 or phone 16. The support 58 is placed through a hole 64 in the housing 56 and a locking device 66 is inserted into the support lumen 60 to keep the housing 56 on the support 58. The housing 56 is able to turn freely on the mounting support 58.

The display face 47A can be both rotated and angled relative to the phone face 47B. FIG. 6C illustrates the virtual image display 12 rotated on the lateral 48 and longitudinal 50 axes. A bottom edge 62 of the insert 14 or phone 16 is rounded as illustrated in FIG. 6D. The mounting support 58 of FIG. 6B is mounted on a cylinder 64 which is free to rotate within the insert 14 or phone 16. The mounting support 58 is placed through the hole 64 in the housing 56 and a locking device 66 is inserted into the lumen 60 of the support 58 to keep the housing 56 on the support 58. The housing 56 is able to turn freely on the mounting support 58 and the cylinder 64 is free to turn within the insert 14 or phone 16 allowing the virtual image display 12 to rotate on the lateral 48 and longitudinal 50 axes.

Figure 7:
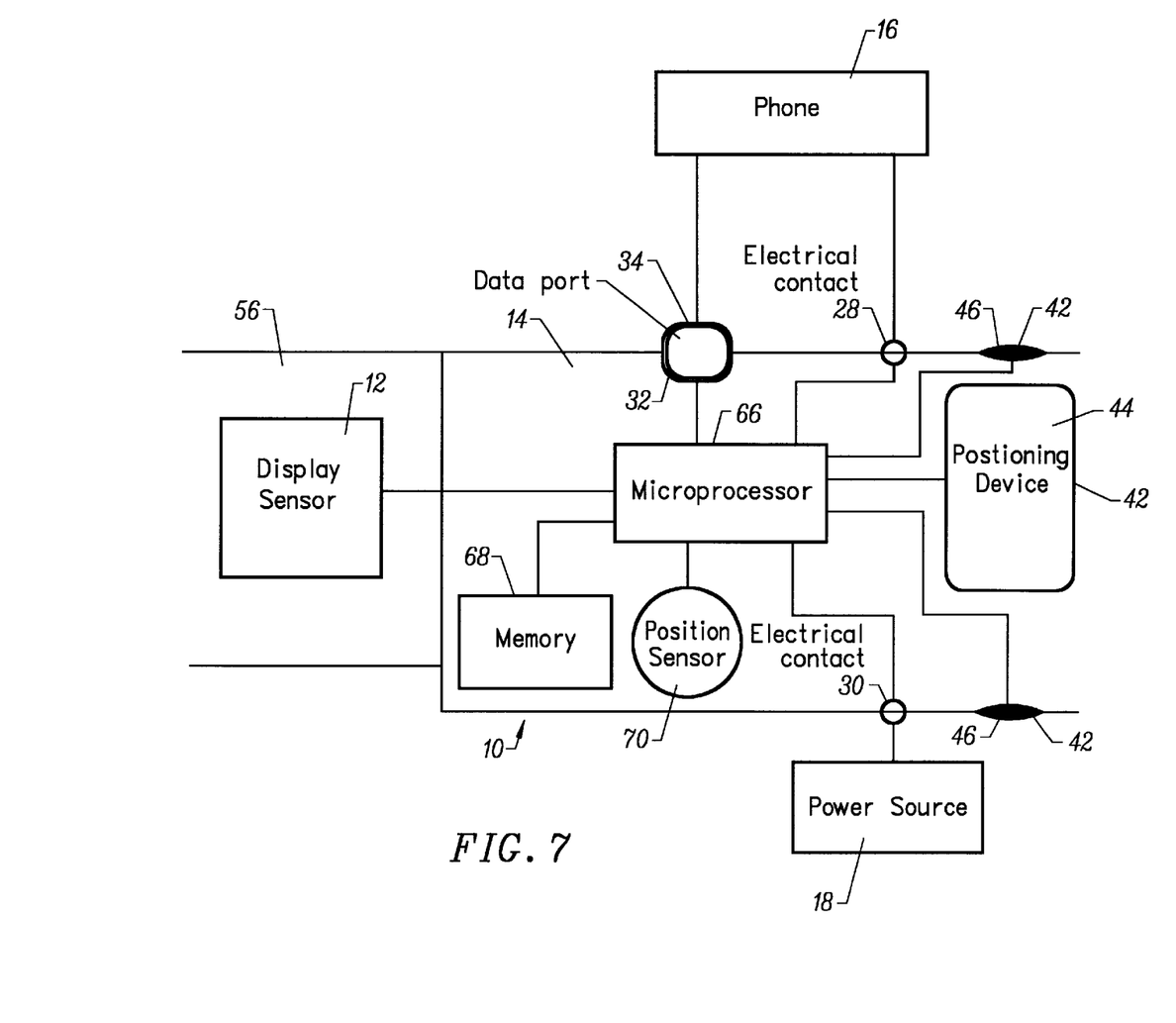
FIG. 7 is a schematic of an insert according to the present invention.

FIG. 7 illustrates a schematic of an insert 14 attached to a phone 16 and a power source 18. The insert 14 includes a microprocessor 66 with access to a ROM 68 including programed logic. The microprocessor is in electrical communication with the virtual image display 12 and a position sensor 70 for detecting the vertical orientation of the phone 16.

Figure 8A:
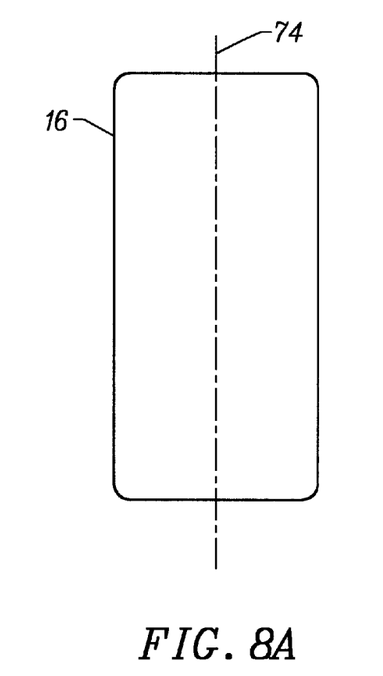
FIG. 8A illustrates a side of a phone being rotated through a vertical plane.
Figure 8B:
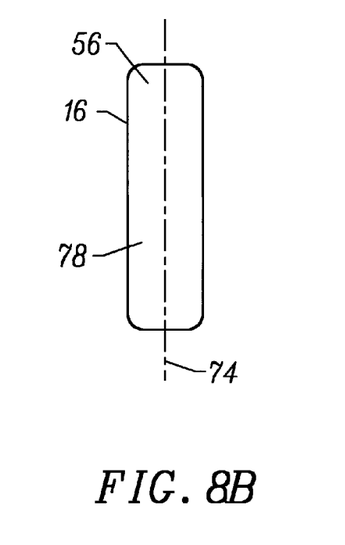
FIG. 8B illustrates an end view of a phone being rotated through a vertical plane.

The logic inverts an image on the virtual image display 12 in response to the orientation of the phone 16. As the longitudinal axis of the phone 16 passes through a vertical plane 74 as shown in frame 76 of FIG. 8A, the logic inverts the image on the virtual image display 12. Similarly, as the end 78 of the phone 16 passes through the vertical plane 74 as illustrated in FIG. 8B, the logic inverts the image on the virtual image display 12.

Referring again to FIG. 7, the microprocessor is in electrical communication with a plurality of user inputs 46. The logic can affect the function of inputs 46 in response to the vertical orientation of the phone 16. For instance, FIG. 4C illustrates an insert 14 including a first input 46 and a second input 46A. The first input 46 can produce first input signal and the second input 46A can produce a second input signal. As the phone 16 rotates through the vertical plane the logic can invert the function of the user inputs. For instance as the phone 16 rotates through the vertical plane, the first input 46 performs the function that was performed by the second input before the phone rotated past the vertical plane and visa versa.

Figure 9:
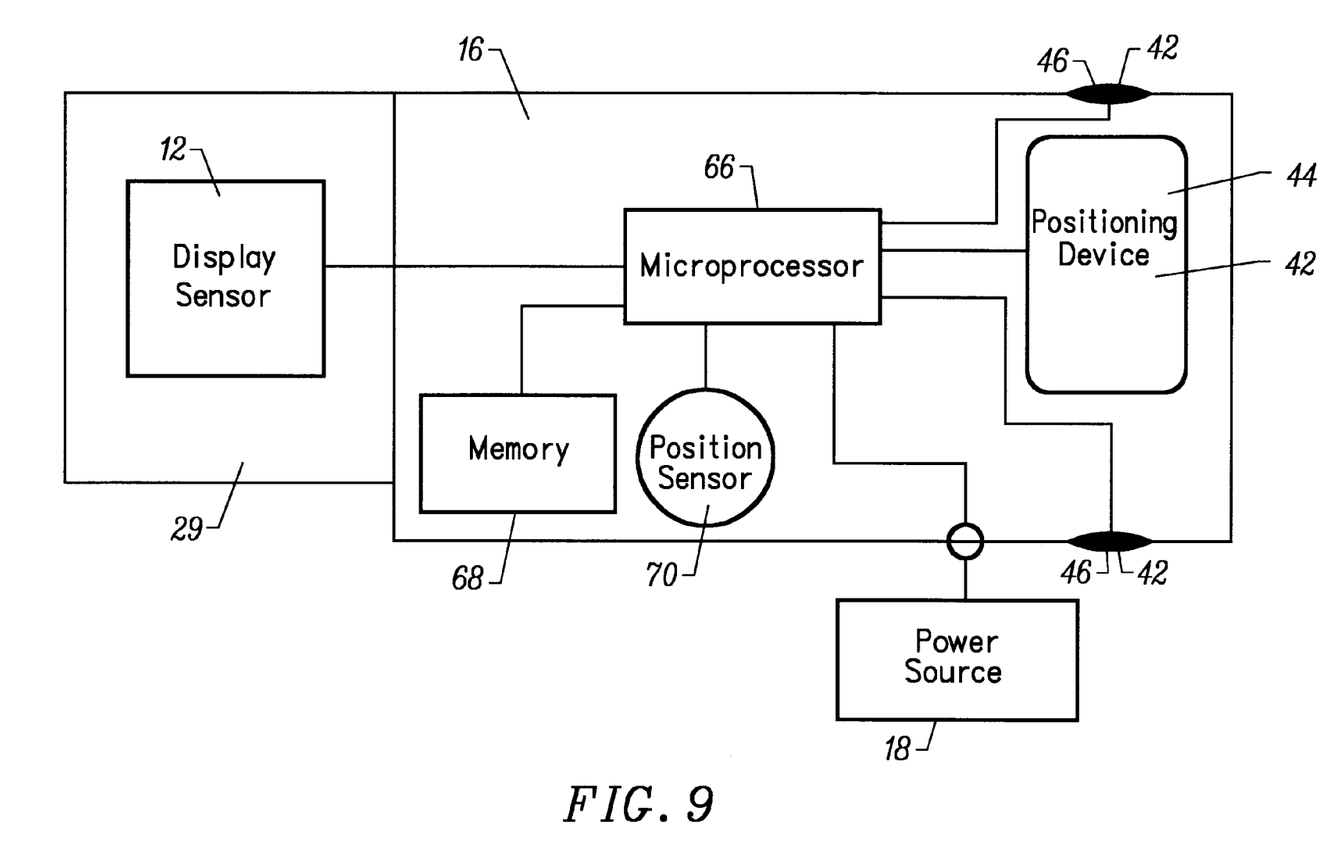
FIG. 9 is a schematic of the embodiment illustrated in FIG. 2.

FIG. 9 illustrates a schematic for the embodiment of FIG. 2. The position sensing device and the at least one user input 42 are positioned within the phone 16 since an insert 14 is not required.

Figure 10:
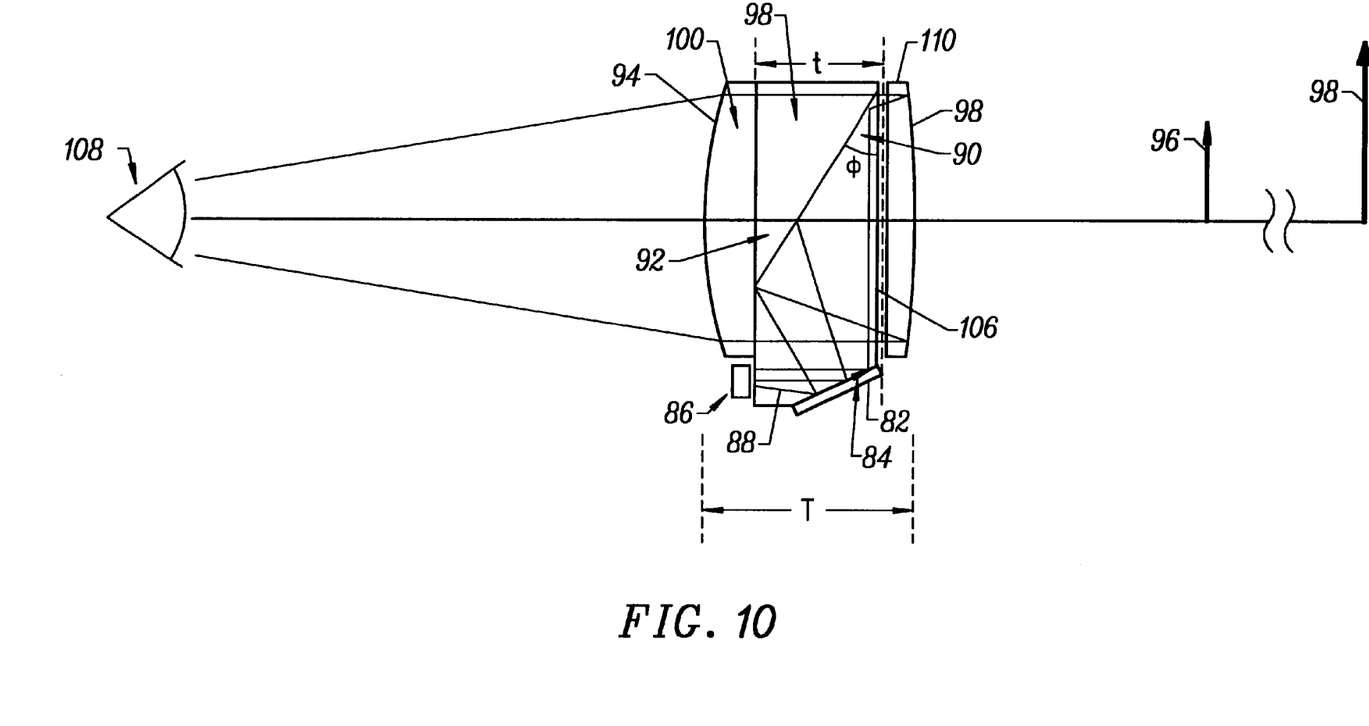
FIG. 10 illustrates a virtual image display which is suitable for use with the present invention.

Suitable virtual image displays 12 for use with the invention are described in Co-Pending Application Number 08/673,894, entitled "Compact Display System with Two Stage Magnification and Immersed Beam Splitter", which is incorporated herein by reference. An embodiment of a suitable virtual image display 12 is illustrated in FIG. 10. The display 12 includes an imaging surface 82 on which a source object 84 is formed. The illustrated imaging surface is a microdisplay which forms the source object. The microdisplay may have a display area of less than 100 mm$^2$. Light from an illumination source 86 is projected onto the imaging surface 82 to cause the source object to be projected into an immersed beam splitting element 88 including a beam splitter 90 immersed in an optically transparent material 92. A portion of the light which reaches the beam splitter 90 is reflected by the beam splitter 90 and directed to first optical element 94.

The first optical element 94 has a reflective function and a magnification function. The image formed by the light projected onto the first optical element 94 is magnified by the magnification function of the element to form a magnified first virtual image 96. The light from the magnified first virtual image 96 is reflected by the reflective function of the element. At least a portion of the light forming the magnified first virtual image 96 passes through the beam splitting element 98 to a second optical element 100. The magnified first virtual image 96 projected onto second optical element 100 is magnified by the second optical element 100 as the light traverses the second optical element 100 to form a compound magnified virtual image 98 which is seen by observer 101. The apparent position of the first magnified virtual image 96 relative to the second optical element is approximately equal to or less than the focal length of the second optical element 100. The compound magnified virtual image 98 appears to be positioned further away than the first magnified virtual image 96, preferably at least 10 inches away. In one embodiment the compound magnified virtual image 98 is at least about 6 feet away to provide for comfortable viewing. order to prevent stray light from interfering with the observer's ability to see the compound virtual image 98 an antireflective coating can be placed on the outside surface 102 of the second optical element 100.

Figure 11:
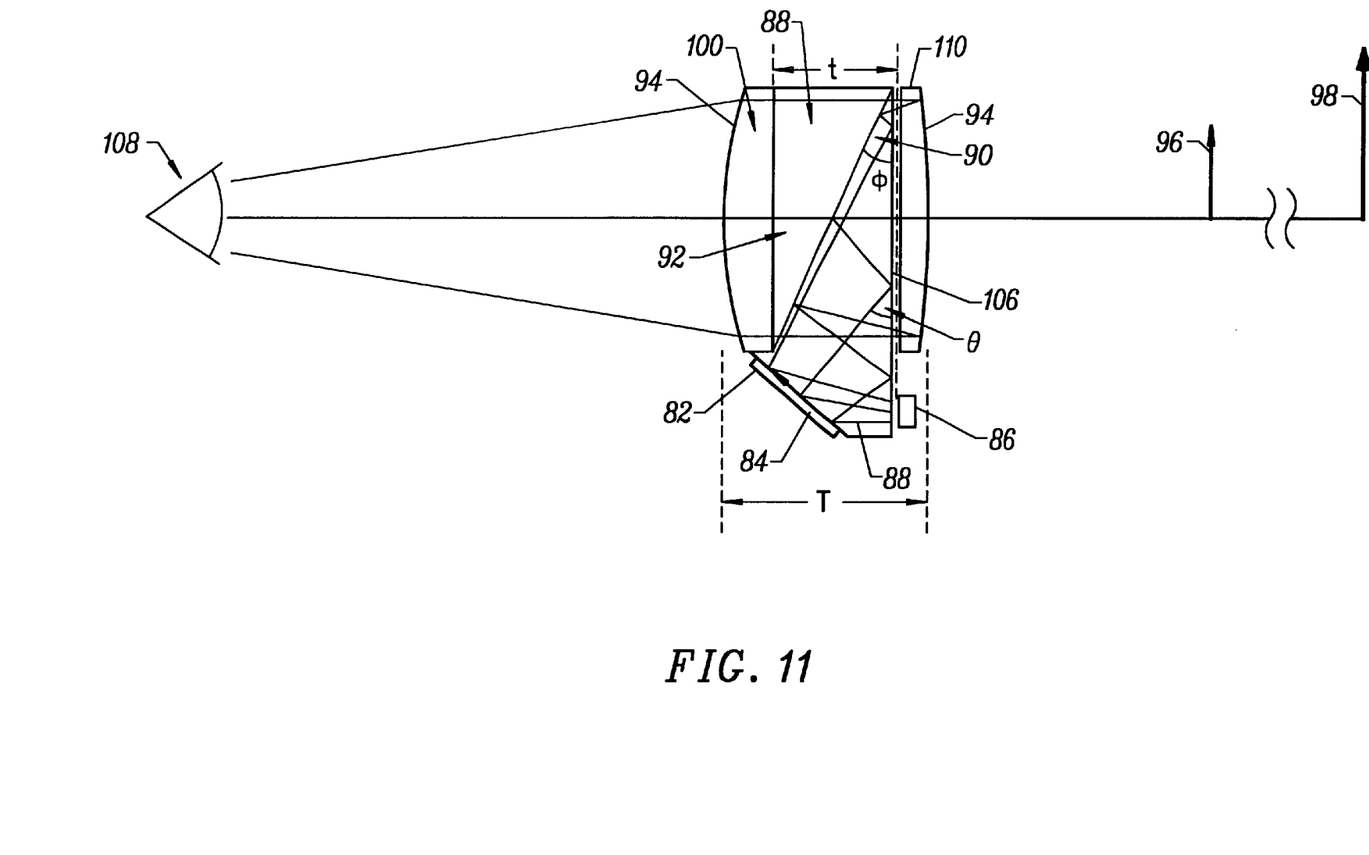
FIG. 11 illustrates a second virtual image display which is suitable for use with the present invention.

FIG. 11 illustrates another embodiment of a virtual image display 12 suitable for use with the present invention. Total internal reflection off the back surface 106 of the beam splitting element 88 is used to further reduce the thickness of the display 12. As illustrated, the display 12 system 10 includes an imaging surface 82 on which a source object 84 is formed. Illumination light 104 projects light 104 onto the imaging surface 82.

The light 104 projected onto the imaging surface 82 causes the source object to be projected toward the back surface 106 of beam splitting element 88. By angling the imaging surface 82 such that the light corresponding to the projected source object contacts the back surface 106 of the beam splitting element 88 at an angle θ less than the angle at which total internal reflection occurs, the light forming the projected source object is reflected off the back surface 106 of the beam splitting element 88 to beam splitter 90. The light is then reflected by the beam splitter 90 and directed to first optical element 94.

The angle θ at which total internal reflection occurs depends on the refractive index material 92 used to form the immersed beam splitting element 88, as well as whether a film is placed on the back surface 106 of the beam splitting element 88. In one embodiment, angle θ is less than about 60°.

Similar to the virtual image display 12 illustrated in FIG. 10, first optical element 94 has a reflective function and a magnification function. The image formed by the light projected onto first optical element 94 is magnified by the magnification function of the element to form a magnified first virtual image 96. The light from the magnified first virtual image 96 is reflected by the reflective function of the element. At least a portion of the light forming the magnified first virtual image 96 passes through the beam splitting element 88 to a second optical element 100. The magnified first virtual image 96 formed by the light projected onto second optical element 100 is magnified by the second optical element 100 as the light traverses the second optical element 100 and is seen as a compound magnified virtual image 98 by the observer 108.

As illustrated in FIGS. 10 and 11 the beam splitter 90 is positioned relative to the plane 110 of the first optical element 94 to direct light from the imaging surface 82 onto the first optical element 94. The apparent position of the first magnified virtual image relative to the second optical element is approximately equal to or less than the focal length of the second optical element.

The angle Φ between the beam splitter 90 and plane 110 limits how close the first and second optical elements 94, 100 may be positioned relative to each other (shown in FIGS. 11 and 12 as distance t) and hence limits the overall thickness T of the display system.

The separation between the first and second optical elements 94, 100 is reduced by using immersed beam splitter 88, i.e., a beam splitter 90 which is contained within one or more optically transparent materials 92 which have a refractive index greater than air. By using an immersed beam splitter, light passes between the imaging surface 82 and the beamsplitting element 88 through a medium having a higher refractive index. The higher refractive index medium causes the source object projected from the imaging surface 82 to be magnified in comparison to an image of the source object which passes between the imaging surface 82 and the beamsplitting element 88 through air. The magnification performed by the beamsplitting element 88 enables a smaller beamsplitting element 88 to be used in the display system, which, in turn, enables the beamsplitting element 88 to be positioned at a tighter angle φ. By reducing the angle φ at which the beamsplitting element 88 is positioned, the distance t between the first and second optical elements 94, 100 is reduced.

In one embodiment of the display 12, as illustrated in FIG. 10, the angle φ between the beam splitter 90 and plane 110 is between about 30 and 45°, in another embodiment, 37°. In another embodiment of the display system which utilizes total internal reflection within beamsplitting element 88, as illustrated in FIG. 11, the angle φ between the beam splitter 90 and plane 110 is between about 10 and 30°, in another embodiment, 25°. Thus, through the total internal reflection employed in the embodiment illustrated in FIG. 11, the angle φ between the beam splitter 90 and plane 110 and hence the separation required between the first and second optical elements 94, 100 is reduced.

The use of an immersed beam splitter also enables a smaller imaging surface 82 to be used and/or for the imaging surface 82 to be positioned further away from the beam splitter 90 than if the source object were projected from the imaging surface 82 to the beam splitter 90 through air. This is important to the compact design of the display system of the present invention since it enables the imaging surface to be positioned out from between optical elements 94, 100 and thus out of the field of view provided by the optical system.

The foregoing description of the preferred embodiment of the invention has been for the purpose of illustration and description. It is not intended to be exhaustive or to limit the invention to the precise forms disclosed. Obviously, many modifications, variations and combinations will be apparent to practitioners skilled in this art. It is intended that the scope of the invention be defined by the following claims and their equivalents.

What is claimed is:

1. A phone accessory for use in combination with a phone and power source comprising:
    an insert having a first side with a set of electrical contacts which contact electrical contacts on the phone when the phone is attached to the insert and a second side with a second plurality of electrical contacts which contact with electrical contacts on the power source when the power source is attached to the insert;
    an insert dataport coupled to a phone dataport on the phone when the phone is attached to the insert; and
    a virtual image display comprising in a single housing a display which includes an imaging surface on which a source object is formed and optics which convert the source object into a virtual image, the virtual image display being attached to the insert such that the virtual image display may be rotated about a longitudinal axis transecting an earpiece and mouthpiece of the phone when the phone is attached to the insert, the virtual image display being in electrical communication with the insert dataport for receiving image data from the phone through the phone and insert dataports, the virtual image display enabling the virtual image to be viewed without expansion of the virtual image display housing.

2. The accessory of claim 1 wherein, the virtual image display is attached to the insert such that the virtual image display is substantially symmetrical about a longitudinal axis of the phone which transects an ear and mouthpiece of the phone.

3. The accessory of claim 1 wherein, the accessory includes one or more user inputs for controlling the virtual image display.

4. The accessory of claim 3 wherein, the at least one user input is a positioning device for controlling a position of a cursor on the virtual image display.

5. The accessory of claim 4 wherein, the positioning device is a trackball.

6. The accessory of claim 4 wherein, the positioning device is a trackpad.

7. The accessory of claim 4 wherein, the positioning device is a plurality of directional buttons.

8. The accessory of claim 1 wherein, the accessory includes two user inputs symmetrically positioned on opposing side edges of the insert for operation by a thumb and index finger of the user while the user is holding the phone in either a left or right hand.

9. The accessory of claim 1, wherein the virtual image display is fixedly attached to the accessory.

10. The accessory of claim 1, wherein the virtual image display is attached to the accessory such that a display face can be variably angled relative to a phone face.

11. The accessory of claim 10, wherein the virtual image display approximately rotates about a lateral axis perpendicular to a longitudinal axis transecting an earpiece and mouthpiece of the phone.

12. The accessory of claim 11, wherein a hinge mechanism attaching the virtual image display to the accessory allows for rotation approximately about the lateral axis.

13. The accessory according to claim 1 further comprising:
   a sensor for sensing an orientation of the accessory relative to a longitudinal axis of the phone which transects an ear and mouthpiece of the phone; and
   logic in communication with the sensor which an image on the virtual image display in response to the sensed orientation of the accessory.

14. The accessory according to claim 13 wherein, the logic inverts the image as the longitudinal axis passes through a vertical plane.

15. The accessory according to claim 13 wherein, the logic inverts the image as a lateral axis perpendicular to the longitudinal axis passes through a vertical plane.

16. The phone accessory of claim 1 wherein the display forming the source object has a display area of less than 100 mm$^2$.

17. A viewing device, comprising:
   a phone including a virtual image display in electrical communication with the phone so as to receive image data from the phone, the virtual image display comprising in a single housing a display which includes an imaging surface on which a source object is formed and optics which convert the source object into a virtual image, the virtual image display being positioned substantially symmetrical relative to a central longitudinal axis transecting an earpiece and mouthpiece on the phone, the virtual image display enabling the virtual image to be viewed without expansion of the virtual image display housing, the virtual image display also being rotatable about the longitudinal axis of the phone.

18. The viewing device of claim 17 wherein, the viewing device includes at east one user input for controlling the virtual image display.

19. The viewing device of claim 18 wherein, the at least one user input is a positioning device for controlling a position of a cursor on the virtual image display.

20. The viewing device of claim 19 wherein, the positioning device is a trackball.

21. The viewing device of claim 19 wherein, the positioning device is a trackpad.

22. The viewing device of claim 19 wherein, the positioning device is a plurality of directional buttons.

23. The viewing device of claim 17 wherein, the viewing device includes a plurality of user inputs which are for cotrolling the virtual image display.

24. The viewing device of claim 23 wherein, the viewing device includes two user inputs symmetrically positioned on opposing side edges of the viewing device for operation by a thumb and index finger of the user while the user is holding the phone in either a left or right hand.

25. The viewing device of claim 17, wherein the virtual image display is fixedly attached to the viewing device.

26. The viewing device of claim 17, wherein the virtual image display is attached to the viewing device such that a display face can be variably angled relative to a phone face.

27. The viewing device of claim 26, wherein the virtual image display approximately rotates about a lateral axis perpendicular to a longitudinal axis transecting an earpiece and mouthpiece of the phone.

28. The viewing device of claim 27, wherein a hinge mechanism attaching the virtual image display to the viewing device allows for rotation approximately about the lateral axis.

29. The viewing device according to claim 17 further comprising:
   a sensor for sensing an orientation of the viewing device relative to a longitudinal axis of the phone which transects an ear and mouthpiece of the phone; and
   logic in communication with the sensor which an image on the virtual image display in response to the sensed orientation of the viewing device.

30. The viewing device according to claim 29 wherein, the logic inverts the image as the longitudinal axis passes through a vertical plane.

31. The viewing device according to claim 29 wherein, the logic inverts the image as a lateral axis perpendicular to the longitudinal axis passes through a vertical plane.

32. The viewing device of claim 17 wherein the display forming the source object has a display area of less than 100 mm$^2$.

* * * * *